(12) United States Patent
Sun et al.

(10) Patent No.: US 11,442,651 B2
(45) Date of Patent: Sep. 13, 2022

(54) METHOD AND DEVICE FOR REBUILDING DATA IN STORAGE ARRAY GROUP

(71) Applicant: EMC IP Holding Company LLC, Hopkinton, MA (US)

(72) Inventors: Lei Sun, Beijing (CN); Jian Gao, Beijing (CN); Hongpo Gao, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 25 days.

(21) Appl. No.: 16/655,386

(22) Filed: Oct. 17, 2019

(65) Prior Publication Data

US 2020/0133503 A1    Apr. 30, 2020

(30) Foreign Application Priority Data

Oct. 29, 2018   (CN) .......................... 201811270527.0

(51) Int. Cl.
     *G06F 3/06*      (2006.01)
     *G06F 11/10*      (2006.01)

(52) U.S. Cl.
     CPC ............ *G06F 3/065* (2013.01); *G06F 3/0604* (2013.01); *G06F 3/0683* (2013.01); *G06F 11/1092* (2013.01)

(58) Field of Classification Search
     CPC ....... G06F 3/065; G06F 3/0604; G06F 3/0683
     See application file for complete search history.

(56) References Cited

U.S. PATENT DOCUMENTS

| | | | |
|---|---|---|---|
| 7,055,059 B2 | 5/2006 | Yanai et al. | |
| 9,448,735 B1* | 9/2016 | Proulx | G06F 3/0632 |
| 10,140,041 B1 | 11/2018 | Dong et al. | |
| 2003/0236944 A1 | 12/2003 | Thompson et al. | |
| 2006/0161805 A1* | 7/2006 | Tseng | G06F 11/1084 |
| | | | 714/E11.034 |
| 2009/0172273 A1* | 7/2009 | Piszczek | G06F 11/1092 |
| | | | 711/E12.019 |
| 2016/0034209 A1* | 2/2016 | Nanduri | G06F 3/0614 |
| | | | 711/114 |
| 2016/0092593 A1* | 3/2016 | Peacock | G06F 16/182 |
| | | | 707/796 |

* cited by examiner

*Primary Examiner* — William E. Baughman
*Assistant Examiner* — Janice M. Girouard
(74) *Attorney, Agent, or Firm* — BainwoodHuang

(57) ABSTRACT

Techniques rebuild data in a storage array group. Such techniques involve: in response to determining that a first storage device of a plurality of storage devices comprised in the storage array group is in a non-working state, generating a write record of the first storage device, the write record indicating whether a write operation occurs for each of a plurality of storage areas in the first storage device during the non-working state; in response to determining that the first storage device returns from the non-working state to a working state, determining, based on the write record, whether a target storage area in need of execution of data rebuilding is present in the first storage device; and controlling, based on the determining, the data rebuilding to be executed on the target storage area.

19 Claims, 7 Drawing Sheets

METHOD AND DEVICE FOR REBUILDING DATA IN STORAGE ARRAY GROUP

CROSS-REFERENCE TO RELATED APPLICATION

This application claims priority to Chinese Patent Application No. CN201811270527.0, on file at the China National Intellectual Property Administration (CNIPA), having a filing date of Oct. 29, 2018, and having "METHOD AND DEVICE FOR REBUILDING DATA IN STORAGE ARRAY GROUP" as a title, the contents and teachings of which are herein incorporated by reference in their entirety.

FIELD

Embodiments of the present disclosure relate to the storage field, and more specifically, to method and device for rebuilding data in a storage array group.

BACKGROUND

Technologies of storage array group, such as Redundant Array of Independent Disks (RAID) group and the like, have been widely applied in recent years. RAID is a data storage virtualization technology and combines a plurality of physical disk drive components into a single logical unit for the purposes of data redundancy, performance improvement or both.

A common situation in the RAID system is to replace or remove a disk drive, and the data rebuilding procedure occurring in this case is referred to as "RAID rebuilding." For example, when the disk accidentally fails, the RAID group copies the data to the backup disk drive while replacing the failure disk. Afterwards, the RAID algorithm and parity data are used to reassemble the data on the new disk drive. If the RAID group detects that a disk drive is going to fail, the RAID rebuilding also may be voluntary. During the data rebuilding, the performance of some applications or procedures may be negatively affected by delay.

In addition, for example, when the removed disk drive returns to the RAID group within a predetermined time period, it is required to execute the data rebuilding procedure on the disk drive. The length of the time required for the data rebuilding procedure is quite important for users.

SUMMARY

Embodiments of the present disclosure provide an improved solution for rebuilding data in the storage array group.

In a first aspect, there is provided a method for rebuilding data in a storage array group. The method includes: in response to determining that a first storage device of a plurality of storage devices included in the storage array group is in a non-working state, generating a write record of the storage device, the write record indicating whether a write operation occurs for each of a plurality of storage areas in the first storage device during the non-working state; in response to determining that the first storage device returns from the non-working state to a working state, determining, based on the write record, whether a target storage area in need of execution of data rebuilding is present in the first storage device; and controlling, based on the determining, the data rebuilding to be executed on the target storage area.

In a second aspect, there is provided an electronic device. The electronic device includes: a processor; and a memory coupled to the processor, the memory having instructions stored therein, the instructions, when executed by the processor, causing the electronic device to perform acts including: in response to determining that a first storage device of a plurality of storage devices included in the storage array group is in a non-working state, generating a write record of the storage device, the write record indicating whether a write operation occurs for each of a plurality of storage areas in the first storage device during the non-working state; in response to determining that the first storage device returns from the non-working state to a working state, determining, based on the write record, whether a target storage area in need of execution of data rebuilding is present in the first storage device; and in response to determining whether the target storage area is present, controlling the data rebuilding to be executed on the target storage area.

In a third aspect, there is provided a computer-readable medium having computer-readable instructions stored thereon, the computer-readable instructions, when executed, causing a device to perform the method according to the first aspect.

In a fourth aspect, there is provided a computer program product tangibly stored on a non-transitory computer-readable medium and including machine-executable instructions, the machine-executable instructions, when executed, causing a machine to perform the method according to the first aspect.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example embodiments of the present disclosure with reference to the accompanying drawings, the above and other objectives, features, and advantages of the present disclosure will become more apparent. In the drawings.

DETAILED DESCRIPTION OF EMBODIMENTS

Figure 1:
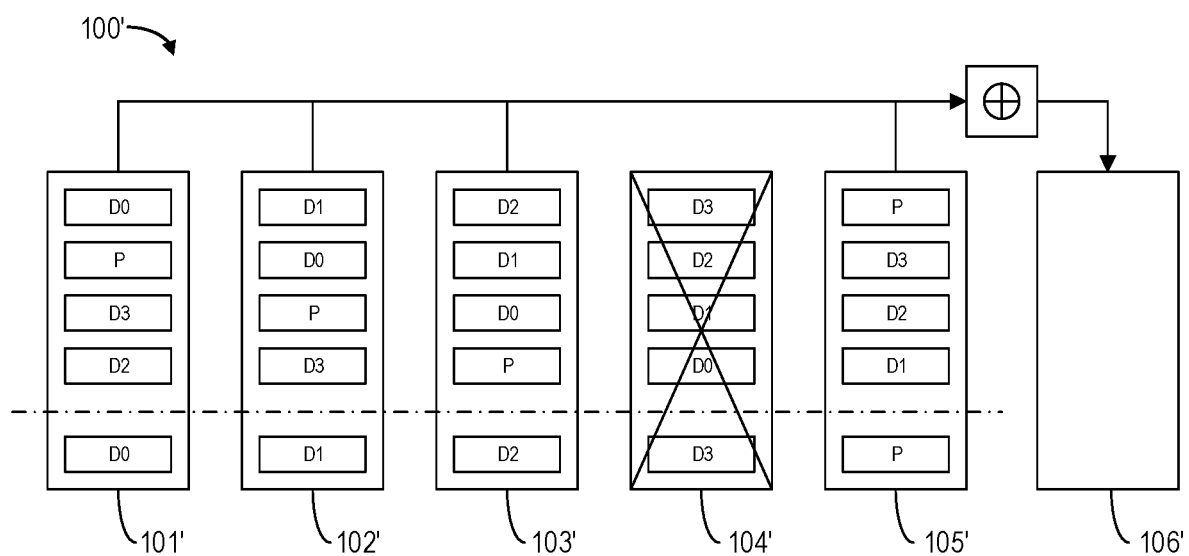
FIG. 1 illustrates a schematic diagram of a storage array group.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principle of the present disclosure will be described with reference to the several example embodiments shown in the drawings. Although the drawings illustrate preferred embodiments of the present disclosure, it should be understood that the embodiments are described merely to enable those skilled in the art to better understand and further implement the present disclosure and is not intended for limiting the scope of the present disclosure in any manner.

FIG. 1 illustrates a schematic diagram of a storage array group 100', which includes a plurality of storage devices 101' to 106'. In a normal operating state, the storage devices 101' to 105' are configured to store the data, while the storage device 106' acts as a backup storage device and is configured to replace any one of the storage devices 101' to 105'. For example, the storage array group 100' may include a RAID group.

In the RAID group, the RAID level refers to required redundancy and performance level. Data are distributed over the storage devices in a corresponding manner based on the RAID level. As an example of the RAID level, the RAID group of the RAID 5 includes block-level stripes with distributed parity. The parity information is allocated in the storage device. In this case, each stripe contains 5 blocks, i.e., 4 data blocks D0 to D3 and 1 parity block P. When a single storage device fails, the subsequent read may be calculated from the distributed parity to avoid data loss. Meanwhile, a hot spare storage device is selected to replace a failure storage device and all data on the failure storage device will be rebuilt and written into a new storage device.

The metadata of the RAID group are divided into two categories: paged metadata and non-paged metadata, wherein the non-paged metadata are configured to record the basic configuration of the RAID group while the paged metadata are configured to describe rebuilding information and I/O quiesced state of each chunk.

TABLE 1

| Field | Meanings |
| --- | --- |
| LUN ID | ID of a logical unit number to which this extent belongs to |
| RAID ID | ID of the mapped RAID to which this extent belongs to |
| RAID Type | RAID protection level of this RAID extent |
| Width | Disk extent count |
| rebuild_logging_bitmask | The bitmap indicates the position required to be rebuilt |
| Rebuilding Checkpoint | Rebuilding pointer |

The non-paged metadata, for example, are illustrated in Table 1, which demonstrates each field and meanings of corresponding field in the non-paged metadata. According to Table 1, the rebuild_logging_bitmask field in the non-paged metadata indicates a position in need of data rebuilding in the storage device and the rebuilding checkpoint field represents rebuilding pointer. The non-paged metadata may include RAID type, width, position of the failure disk and the like in the RAID group.

TABLE 2

| Field | Meanings |
| --- | --- |
| Valid bit | Paged metadata record is valid or not |
| Quiesce_io_flag | Flag indicates whether I/O is quiesced |
| need_rebuild_bitmask | The position which needs to be rebuilt in a chunk |

The paged metadata, for example, are shown in Table 2, which demonstrates each field and meanings of corresponding field in the paged metadata. According to Table 2, need_rebuild_bitmask field in the paged metadata indicates a position which needs to be rebuilt in the chunk. The paged metadata may include state and quiesce Input/Output (I/O) flag of all chunks in the RAID group.

In the RAID group, data are rebuilt according to the following traditional method of data rebuilding procedure. First, a failure in a disk drive is discovered and a failure event is sent, to notify that one disk drive in the RAID group has been removed. At this time, the RAID group enters a degraded state, but still may provide data services. Afterwards, the RAID group marks the rebuild_logging_bitmask field in the non-paged metadata shown by Table 1 based on the position of the removed disk drive in the RAID group. If the write operation is sent to the RAID group in the degraded state, the need_rebuild_bitmask field in the paged metadata shown by Table 2 is firstly set before writing data. If the original disk drive has already been restored before the swap of the hot spare disk drive, the need_rebuild_bitmask field is evaluated to look up a rebuilding logging disk position and acquire a checkpoint for the disk drive. If a timer is expired (e.g., 5 minutes), a new disk drive (hot spare disk drive) is swapped to replace the failure disk drive. After swapping the new disk drive, the RAID group receives an event and is notified that the new disk drive is ready. Next, it is required to mark the need_rebuild_bitmask field in the paged metadata for each chunk. When the need_rebuild_bitmask field is marked, an evaluation rebuilding logging is cleared. Then, the data rebuilding operation is initiated to rebuild the data chunk by chunk according to the marked need_rebuild_bitmask field in the paged data.

For example, in the RAID 5, if one disk drive in the RAID group is removed or fails so that the RAID group enters a degraded state, the rebuild_logging_bitmask field in the non-paged metadata is set at a corresponding position and the rebuilding checkpoint is set to 0. When the removed disk drive is re-inserted or replaced by the new disk drive, the need_rebuild_bitmask field in the paged metadata may be set based on the situation and the rebuilding background service is initiated subsequently. The rebuilding operation is executed in the RAID group chunk by chunk until all chunks in need of rebuilding are rebuilt and the rebuilding checkpoint field is set to indicate that the rebuilding is completed.

In a case where an original disk drive is inserted, if there are no write operations in the chunk during the degraded state of the RAID group, the chunk is not required to be rebuilt. Instead, it is required to only check the need_build_bitmask in the paged metadata and change the rebuilding checkpoint to a next chunk. It is universally known that disk capacity is increasing along with the development of the storage technology. The above rebuilding procedure will cost some time, even traverses all chunks in the RAID group, because many chunks are processed by reading the paged metadata on the disks. If the rebuilding scope to be checked may be narrowed and the number of reads of the paged metadata may be reduced, the rebuilding performance may be improved.

In another case, after a first disk drive in the RAID group is removed and the RAID group is in a degraded state, if a second disk drive fails or is removed before the completion of data rebuilding of the removed first disk drive, the RAID group goes offline and cannot provide services for the write operations of the users, which will lead to user data loss. Sometimes, the first drive disk is interfered by a short-term pulse or inserted immediately and there are no write operations on the first disk drive, so that the rebuilding procedure for the first disk drive is not required. Even if the second drive is removed, the RAID group is in fact in the degraded state instead of the offline state, and the RAID group may continue to provide services for the write operations. If such situation may be determined and the RAID group is enabled to go back to a normal working state or an online state as soon as possible when the first disk drive is returned, the offline risk of the RAID group may be significantly reduced.

It can be seen from the above description that the rebuilding time of the RAID group is crucial. Storage devices with higher capacity or multiple failure storage devices may lead to longer data rebuilding time. As the capacity of the storage device increases every year, the data rebuilding time also grows correspondingly. In other words, if the data rebuilding time is not reduced, uses will face an increase of the offline risk of the RAID group, which will result into data loss. Therefore, it is quite important to reduce the data rebuilding time of the RAID group.

Traditionally, when the RAID group enters the degraded state, the entire chunks at the storage position where the disk drive is removed or fails (hereinafter simply referred to as "non-working state") are checked chunk by chunk to determine whether there are write operations for the disk drive during its non-working state. In fact, it is only required to rebuild target chunks of the write operations for the disk drive when the disk drive is in the non-working state. If it can be easily determined whether the write operations occur at the corresponding position of the disk drive and which target chunk scope is directed by the write operations, the data rebuilding procedure may be simplified and the data rebuilding performance may be enhanced. In addition, after the first disk drive in the RAID group is removed and the RAID group is in the degraded state, if the second disk drive enters the non-working state before completion of the data rebuilding for the removed first disk drive, the RAID group is in the offline state. If the rebuilding time for the first disk drive may be significantly reduced, the risk for the RAID group entering the offline state may be lowered.

Embodiments of the present disclosure provide a solution for rebuilding data in a storage array group, such as RAID group and the like, which may reduce the data rebuilding time and lower the offline risk of the storage array group. In general, embodiments of the present disclosure indicate, by the write record, whether a write operation occurs for each of a plurality of storage areas divided for the storage device during the non-working state and determine, based on the write record, whether there is a target storage area in need of executing data rebuilding in the storage device, so as to control the data rebuilding to be performed on the target storage area.

In accordance with embodiments of the present disclosure, a plurality of bits in the write record correspond to the respective storage areas in the storage device, respectively, to indicate the storage area for which the write operation is performed. The write record is checked during the data rebuilding procedure. If the write record indicates the absence of the write operation, an indication of the completion of data rebuilding is generated and data rebuilding is not executed for the storage device. If the write record indicates the presence of the write operation, the rebuilding checkpoint skips to a particular chunk scope in the storage area to perform data rebuilding. Accordingly, the data rebuilding is controlled based on the write record, which may significantly reduce the time required for data rebuilding and lower the offline risk of the storage array group.

Figure 2:
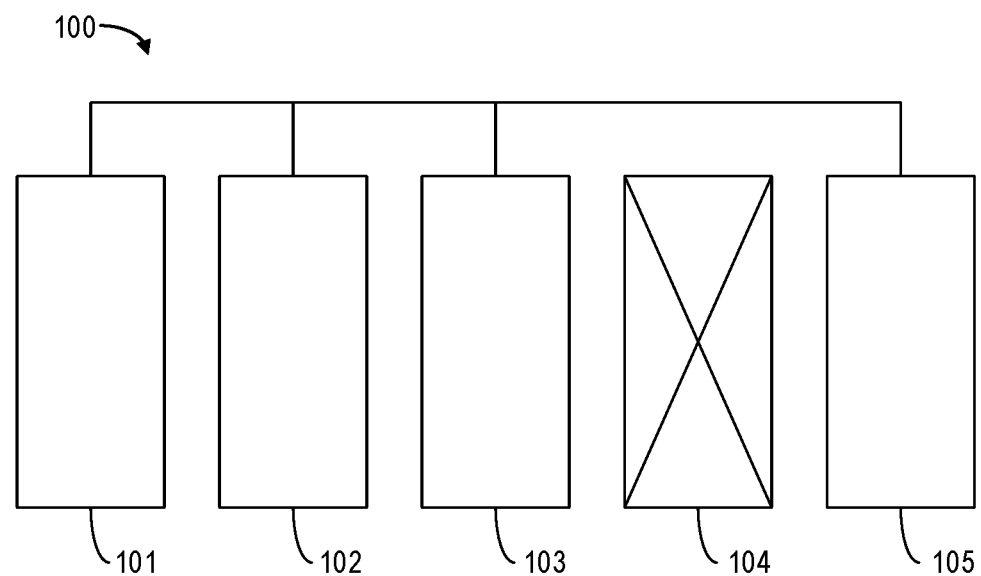
FIG. 2 illustrates a schematic diagram of a storage array group where embodiments of the present disclosure may be implemented.

FIG. 2 illustrates a schematic diagram of a storage array group 100 where embodiments of the present disclosure may be implemented. The storage array group 100 includes a plurality of storage devices 101 to 105. In the normal operation state, the storage devices 101 to 105 are configured to store the data. In some embodiments, the storage array group 100 may further include the backup storage device. It should be appreciated that the storage array group 100 may consist of any number of storage devices.

In some embodiments, the storage array group 100 may include a RAID group. In some embodiments, any storage device in the plurality of storage devices 101 to 105 may include the disk drive. In other embodiments, any storage device in the plurality of storage devices 101 to 105 may include other types of storage devices, e.g., solid-state disk. In some embodiments, the storage array group 100 may be an array group formed by disk drives. In other embodiments, the storage array group 100 may be an array group formed by other types of storage devices, such as solid-state disk and the like. In other embodiments, the storage array group 100 may be an array group formed by disk drives and other types of storage devices (e.g., solid-state disk and the like).

Hereinafter, the storage array group 100 is referred to the RAID group having the level of RAID 5 and taken as an example for description. It should be understood that the storage devices in the RAID group described below are not limited to the disk drives, but also may include other existing types of storage devices.

According to FIG. 2, the first storage device 104 is removed or fails for some reasons and enters the non-working state, and the storage array group 100 will enter the degraded state until the rebuilding procedure is completed. In the degraded state, the storage array group 100 may still provide services for the users. Afterwards, since the first storage device 104 is just interfered by the short-term pulse or the failure of the first storage device 104 is cleared, the first storage device 104 may return from the non-working state to the normal working state. At this time, it is required to perform the rebuilding on the returned first storage device 104.

Figure 3:
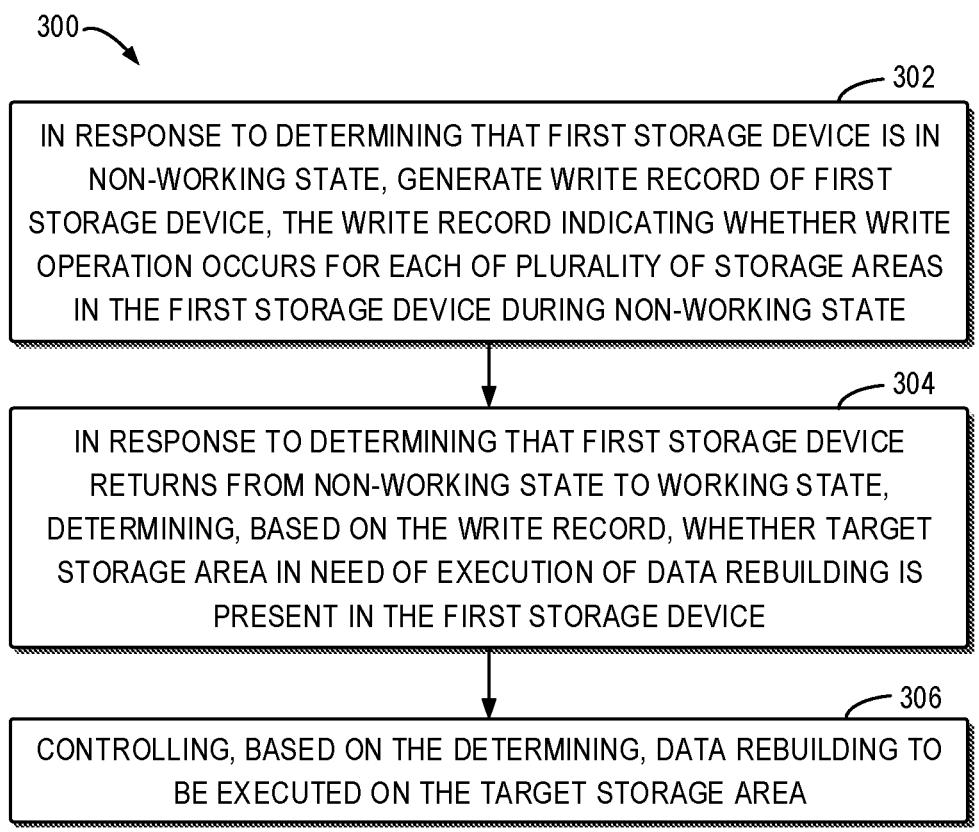
FIG. 3 illustrates a flowchart of a method for rebuilding data in a storage array group in accordance with embodiments of the present disclosure.

FIG. 3 illustrates a flowchart 300 of a method for rebuilding data in the storage array group 100 in accordance with embodiments of the present disclosure.

At block 302, in response to determining that a first storage device 104 of a plurality of storage devices 101 to 105 included in the storage array group 100 is in the non-working state, the write record of the first storage device 104 is generated, the write record indicates whether the write operation occurs for each of a plurality of storage areas in the first storage device 104 during the non-working state.

In some embodiments, the write record includes a plurality of bits. Each bit corresponds to a respective storage area in the plurality of storage areas and indicates whether the write operation occurs for the respective storage area. In some embodiments, the write record may be included in the information for indicating configuration and state of the storage array group 100. In some embodiments, the write record is included in the non-paged metadata which record the basic configuration of the storage array group 100. In some embodiments, the write record is a bitmap corresponding to the first storage device 104.

TABLE 3

| Field | Meanings |
|---|---|
| LUN ID | ID of a logical unit number to which this extent belongs to |
| RAID ID | ID of the mapped RAID to which this extent belongs to |
| RAID Type | RAID protection level of this RAID extent |
| Width | Disk extent count |
| rebuild_logging_bitmask | The bitmap indicates the position required to be rebuilt |
| Rebuild checkpint | Rebuilding pointer |
| degraded_write_bitmap | The bitmap indicates an occurrence of a degraded write operation |

In some embodiments, the write record is added into the non-paged metadata as degraded_write_bitmap field as shown in Table 3. The difference from the non-paged metadata in the prior art shown by Table 1 is that, the metadata illustrated in Table 3 are added with the degraded_write_bitmap field to serve as the bitmap for indicating an occurrence of the write operation in the degraded state. In some embodiments, the write record is included in the traditional non-paged metadata to form new non-paged metadata.

It should be appreciated that arrangement, quantity and type of the fields in the metadata including the write record shown in Table 3 are by way of example. In other embodiments, the metadata including the write record may contain other fields of different orders, numbers and types and may be adjusted according to the requirements.

Figure 4:
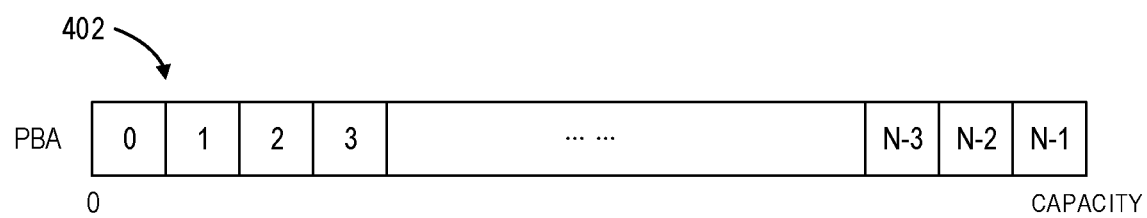
FIG. 4 illustrates a schematic diagram of configuration of a write record in accordance with embodiments of the present disclosure.

FIG. 4 illustrates a schematic diagram of configuration of the write record 402 in accordance with embodiments of the present disclosure. As described above with reference to FIG. 2, the storage device 104 in the storage array group 100 enters the non-working state and the write record shown by FIG. 4 is a bitmap corresponding to the storage device 104.

In some embodiments, the write record 402 includes N bits and the storage device 104 is divided into N storage areas, each bit in the N bits corresponds to a respective storage area of the N storage areas, where N is a positive integer. In some embodiments, for example, the write record 402 is a 32-bit bitmap and the storage space of the storage device 104 is divided into 32 areas of the same size. Each bit in the bitmap corresponds to a chunk range of each storage area. For example, in a case where the capacity of the storage device 104 is 16 T, each bit in the write record 402 then corresponds to the storage area of 500 M and represents whether the write operation occurs for the 500 M space in the degraded state. It should be appreciated that these numbers are by way of example and other suitable values may be employed based on the requirements.

If one bit of the write record 402 is set to 1, it means that the write operation occurs for the 500 M storage area corresponding to this bit when the storage array group 100 is in the degraded state. If one bit of the write record 402 is set to 0, it means that no write operation occurs for the storage area corresponding to the bit in the degraded state and the data within the range of the storage area do not need to be rebuilt.

In some embodiments, generating the write record 402 of the first storage device 104 includes: initializing the write record; in response to determining that the write operation occurs for the first storage device 104 during the non-working state, calculating an address range of the write operation; determining, based on the calculated address range, the storage area for which the write operation occurs; and setting the write record to indicate the determined storage area.

Figure 5:
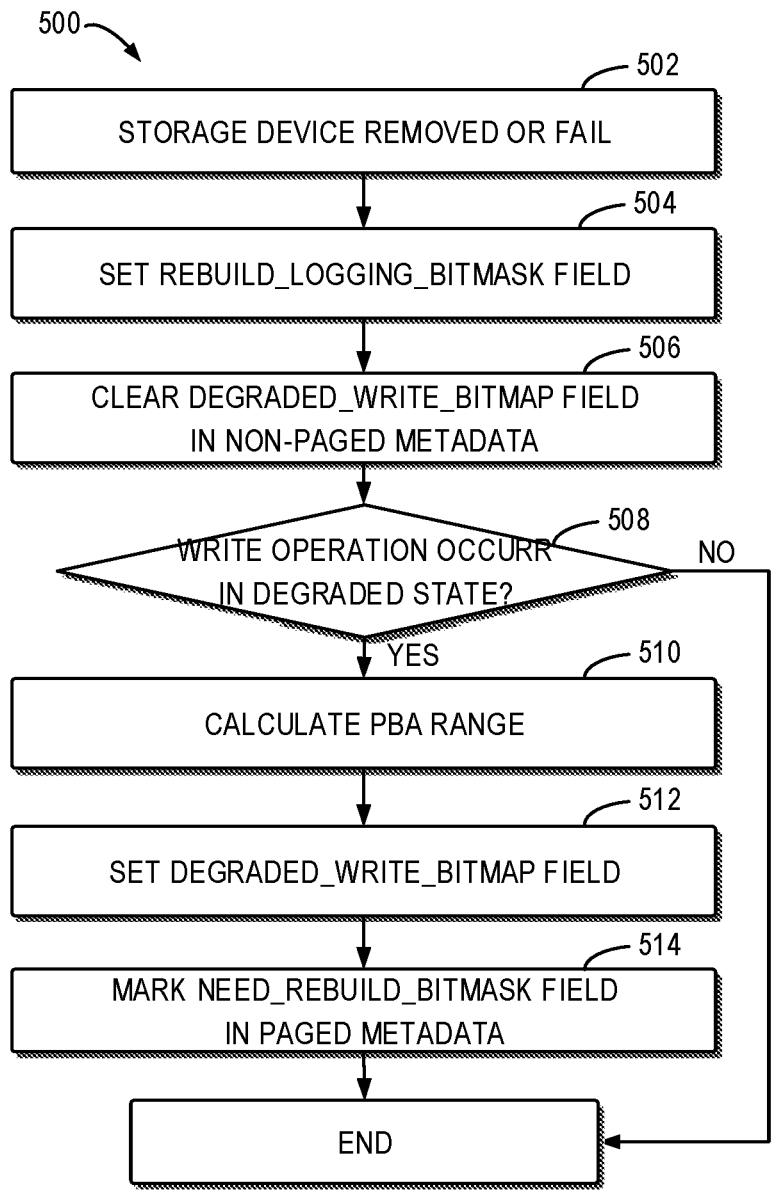
FIG. 5 illustrates a flowchart of a processing procedure in accordance with embodiments of the present disclosure.

In the storage array group 100, when the first storage device 104 enters the non-working state (removed or failing), the write record 402 is initialized to be cleared. Before the first storage device returns from the non-working state to the normal working state, the write record may be set to indicate whether the write operation occurs for the respective storage areas of the first storage device and indicate the chunk range where the write operation occurs. The processing procedure at block 302 will be described in details below with reference to FIG. 5. FIG. 5 illustrates a flowchart 500 of the processing procedure in accordance with embodiments of the present disclosure.

At block 502, the first storage device 104 is removed or fails and the storage array group 100 receives this event.

At block 504, in response to this event, the rebuilding logging is evaluated and the rebuild_logging_bitmask field in the non-paged metadata is set for the position (degradation position) of the storage device 104.

At block 506, the degraded_write_bitmap field (the write record 402) in the non-paged metadata is cleared.

At block 508, it is determined whether the write operation occurs for the first storage device 104 during a period of time before the first storage device 104 returns to the normal operating state or a backup storage device enters the working state (during the degraded state). In the embodiments, when the write operation is sent to the storage array group 100, logical block address (LBA) range of the write operation is mapped to physical block address (PBA) range. If the write operation hits the degradation position of the storage device 104, it is determined that the write operation occurs for the first storage device 104. If it is determined as "YES," the processing procedure proceeds to block 510; if it is determined as "NO," the processing procedure ends.

At block 510, the PBA range is calculated to determine the corresponding storage area for which the write operation occurs in the first storage device 104.

At block 512, the bit corresponding to the storage area for which the write operation occurs is set to 1 in the degraded_write_bitmap field of the non-paged metadata based on the calculated PBA range.

Optionally, at block 514, the need_rebuild_bitmask field in the paged metadata is marked for the chunks in the storage areas corresponding to the set bit, for subsequent data rebuilding.

The above processing procedure is a procedure of the entire data rebuilding procedure after the storage device enters the non-working state and before it returns to the normal-operating state. The processing procedure after the storage device returns to the normal working state will be described below.

Return to FIG. 3, at block 304, in response to determining that the first storage device 104 returns from the non-working state to the working state, it is determined, based on the write record 402, whether there is a target storage area in need of execution of the data rebuilding in the first storage device 104. Besides, at block 306, the data rebuilding to be executed on the target storage area is controlled on the basis of determining whether there is a target storage area in need of execution of the data rebuilding in the first storage device 104. In some embodiments, the data rebuilding is executed in units of chunks of the target storage area.

In some embodiments, in response to the write record 402 indicating that no write operation occurs for the storage area of the first storage device 104 during the non-working state, the target storage area is determined as absent. In addition, an indication of completion of the data rebuilding is generated based on the above determination and no data rebuilding is performed on the first storage device 104. When the first storage device 104 is inserted within a predetermined time period to return to the normal working state, the write record 402 (e.g., degraded_write_bitmap field) in the non-paged metadata is read to determine whether the write operation occurs for the first storage device 104. If no write operation occurs for the first storage device 104 during the period from the first storage device 104 entering the non-working state to returning to the normal-working state, the indication of completion of the data rebuilding operation may be generated and no data rebuilding is performed for the first storage device. For example, the rebuilding checkpoint field may be set to indicate the completion of the data rebuilding operation.

In some embodiments, in response to the write record 402 indicating that the write operation occurs for the storage area of the first storage device 104 during the non-working state, the storage area is set as the target storage area and the presence of the target storage area is determined. In addition, based on the above determination, for each storage area in the target storage area, the address range of the storage area on which the write operation is to be executed is determined, and the data rebuilding is executed for the address range and the indication of completion of the data rebuilding is generated.

Figure 6:
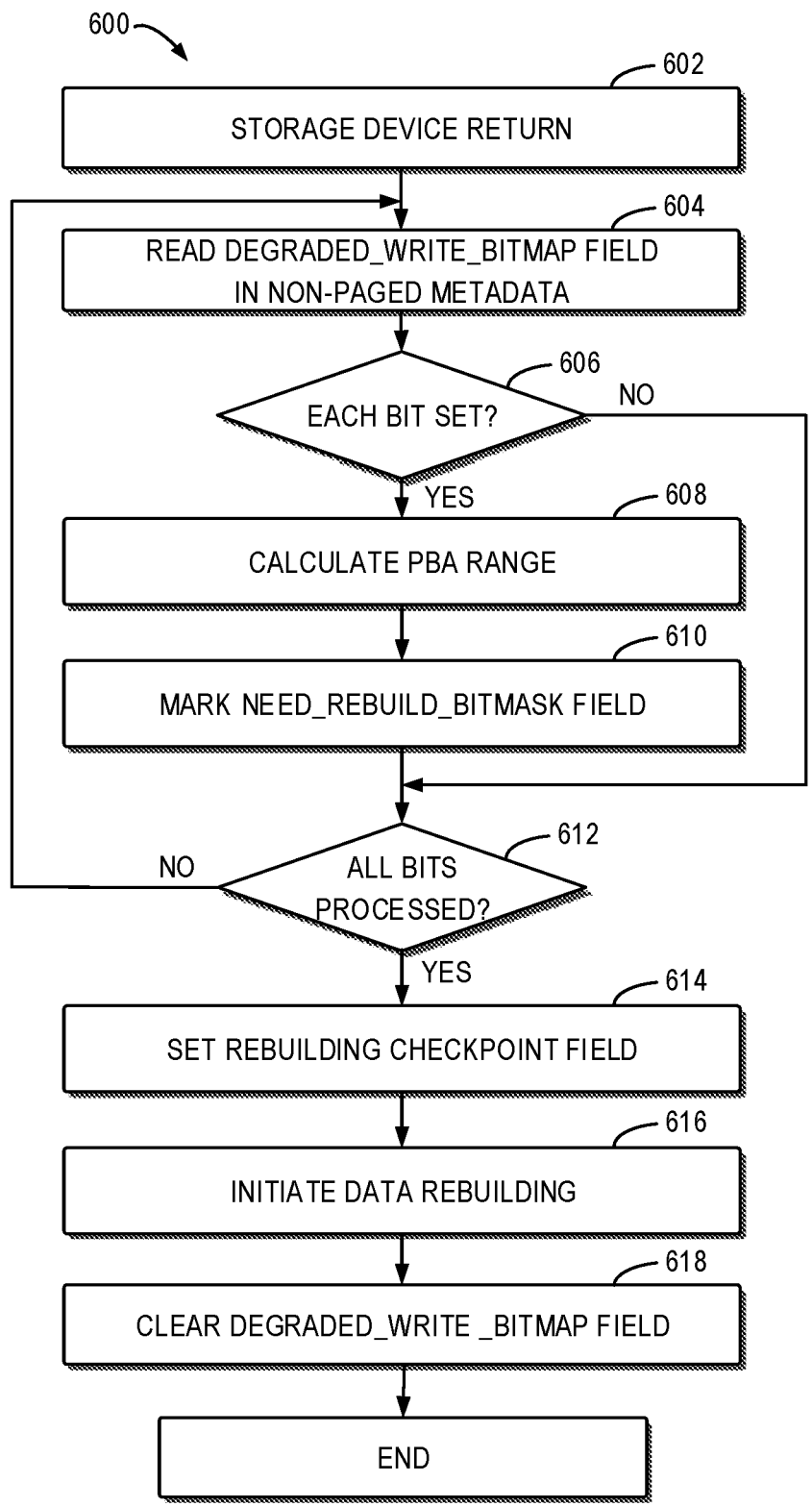
FIG. 6 illustrates a flowchart of a processing procedure in accordance with embodiments of the present disclosure.

The processing procedures of blocks 304 and 306 will be described below with reference to FIG. 6. FIG. 6 illustrates a flowchart 600 of a processing procedure in accordance with embodiments of the present disclosure.

At block 602, the storage device 104 returns from the non-working state to the normal working state and the storage array group 100 receives this event.

At block 604, in response to this event, the degraded_write_bitmap field (write record 402) in the non-paged metadata is read.

At block 606, if one bit in the write record 402 is 0, it means that no write operation occurs for the storage area corresponding to this bit in the storage device 104 during the degraded state, and the processing procedure proceeds to block 612 to check the next bit. If one bit in the write record 402 is set to 1, it means that the write operation occurs for the storage area corresponding to this bit in the storage device 104 during the degraded state, and the processing procedure proceeds to block 608.

At blood 608, the PBA range in the storage area corresponding to the bit is calculated based on one set bit in the write record 402.

At block 610, in response to the calculated chunk address range, the need_rebuild_bitmask field in the paged metadata is marked to determine the chunks of the storage area on which the data rebuilding is to be performed.

At block 612, in response to determining the chunks of the storage area corresponding to one bit, a next bit in the write record 402 is checked. If there are unprocessed bits, the processing procedure returns to the block 604. If all bits have been processed, the processing procedure proceeds to block 614.

At block 614, after all bits are processed, the rebuilding checkpoint field in the non-paged metadata is set to start the data rebuilding.

At block 616, the data rebuilding starts.

At block 618, the degraded_write_bitmap field is cleared and the rebuilding procedure ends.

It should be understood that the above described processing procedure of blocks 614 to 618 is known in the art and its detailed description is omitted here.

In the embodiments of the present disclosure, N bits of the write record 402 in the non-paged metadata are checked and the storage areas corresponding to the set bits in the write record 402 are determined. When the storage device 104 is inserted back to the storage array group 100 so that the storage array group 100 enters the normal working state, if each bit of the N bits of the write record 402 is 0, it indicates that no write operation occurs for the storage device 104 from the removal of the storage device 104 to its return, and the rebuilding checkpoint field is set to indicate the completion of the data rebuilding procedure. Since it is only required to check N bits of the write record 402 rather than reading the paged metadata for each chunk of the storage device 104, the time required for the data rebuilding procedure of the storage device 104 may be reduced, thereby narrowing the time window when the storage array group 100 is in the degraded state and lowering the offline risk of the storage array group 100.

In addition, when the storage array group 100 is in the degraded state, if the write operation is sent to the storage array group 100, the logical block address (LBA) may be mapped to physical block address (PBA) and the position of the storage device. If the position of the storage device 104 is hit, the bit corresponding to the storage area to which the chunk range belongs in the storage device 104 is set in the write record 402. When the storage device 104 returns to the normal working state, the write record 402 in the non-paged metadata is checked. If some bits in the write record 402 are set to 1, it is determined that the write operation occurs for the storage areas corresponding to these bits, and the rebuilding checkpoint is set as a starting chunk address of the chunk range indicated by the write record 402 and skips to the corresponding chunk to rebuild data. Since the target storage area for which the data rebuilding is to be performed is determined based on the indications of N bits of the write record 402 and the chunks to be performed with the data rebuilding in the target storage area are subsequently determined, without reading the paged metadata for each chunk to determine the chunks to be performed with the data rebuilding, the time required for the data rebuilding of the storage device 104 may be reduced, thereby narrowing the time window when the storage array group 100 is in the degraded state and lowering the offline risk of the storage array group 100.

Usually, a waiting time for replacing the first storage device 104 with the backup storage device is set to 5 minutes, which means that after the first storage device 104 enters the non-working state, if the first storage device 104 fails to return to the normal working state within 5 minutes, it will be replaced by the backup storage device.

In some embodiments, the method in accordance with embodiments of the present disclosure may further include: in response to determining that the first storage device 104 maintains in the non-working state for a time longer than a predetermined time period (e.g., 5 minutes or other time periods), the data rebuilding is executed in the backup storage device associated with the first storage device 104 by using all data for the first storage device 104. If the storage device 104 fails to return to the normal working state after a predetermined time period, the storage array group 100 replaces the storage device 104 with the backup storage device. When the backup storage device enters the working state in replacement of the first storage device 104, it is required to rebuild all data on the positions of the first storage device 104. In this case, each bit of the write record 402 is set to 1. For example, the bitmap of the write record 402 is set to 0xffffffff to facilitate executing the conventional data rebuilding procedure. The data rebuilding in the backup storage device is well-known in the art and its detailed description is omitted here.

In some embodiments, the method according to embodiments of the present disclosure may further include: storing, in a backup area, the data which are to be written into the first storage device 104, the backup area is included in any storage devices of the storage devices 101, 102, 103 and 105. Under such circumstance, this processing procedure is well-known in the art and its detailed description is omitted here.

It should be appreciated that the write record 402 corresponding to the first storage device 104 is configured for the above described RAID 5. When the storage array group is set to RAID 6, the storage array groups allows two storage device to stay in the non-working state while continuing to provide the data services. In this case, a first write record and a second write record respectively corresponding to a first storage device and a second storage device entering the non-working state may be configured for the RAID 6. Therefore, the concept in accordance with the present disclosure is not only suitable for the above described RAID 5, but also for other levels, such as RAID 6 etc.

Figure 7:
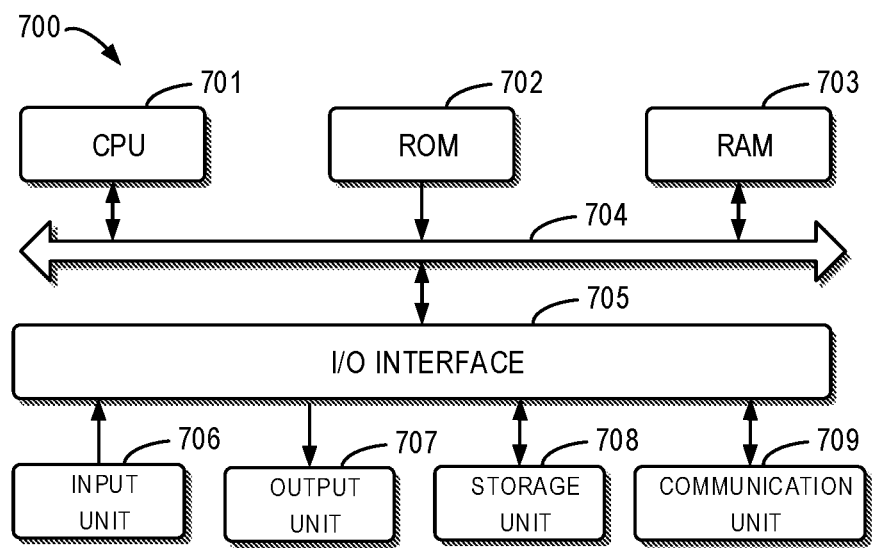
FIG. 7 illustrates a schematic block diagram of an example device for implementing embodiments of the present disclosure.

FIG. 7 illustrates a schematic block diagram of an example device 700 for implementing embodiments of the present disclosure. The device 700 may be used for implementing a part of the storage array group 100 shown in FIG. 2. As demonstrated, the device 700 includes a central process unit (CPU) 701, which may execute various suitable actions and processes based on the computer program instructions stored in the read-only memory (ROM) 702 or computer program instructions loaded in the random-access memory (RAM) 703 from a storage unit 708. The RAM 703 may also store all kinds of programs and data required by the operations of the device 700. CPU 701, ROM 702 and RAM 703 are connected to each other via a bus 704. An input/output (I/O) interface 705 is also connected to the bus 704.

A plurality of components in the device 700 is connected to the I/O interface 705, the plurality of components including: an input unit 706, such as keyboard, mouse and the like; an output unit 707, e.g., various kinds of display and loudspeakers etc.; a storage unit 708, such as disk and optical disk etc.; and a communication unit 709, such as network card, modem, wireless transceiver and the like. The communication unit 709 allows the device 700 to exchange information/data with other devices via the computer network, such as Internet, and/or various telecommunication networks.

The processing unit 701 executes the above described methods and processes, such as procedure 300, procedure 500 and/or procedure 600. For example, in some embodiments, the procedure 300, procedure 500 and/or procedure 600 may be implemented as computer software program or computer program product tangibly included in the machine-readable medium, e.g., storage unit 708. In some embodiments, the computer program may be partially or fully loaded and/or mounted to the device 700 via ROM 702 and/or communication unit 709. When the computer program is loaded to RAM 703 and executed by the CPU 701, one or more steps of the procedure 300, procedure 500 and/or procedure 600 may be implemented. Alternatively, in other embodiments, the CPU 701 may be configured via any other suitable ways (e.g., by means of firmware) to execute the procedure 300, procedure 500 and/or procedure 600.

In accordance with embodiments of the present disclosure, the field of the write record is added in the traditional non-paged metadata. The write record is configured as a bitmap having N bits, each bit corresponds to a respective storage area in the first storage device entering the non-working state and indicates whether a write operation occurs for the respective storage area during the non-working state. When the first storage device returns from the non-working state to the normal working state, the respective bits of the write record are checked and the storage areas in need of data rebuilding in the first storage device are determined based on the indication of the write record. Since it is only required to check N bits in the write record without determining, for each chunk in the first storage device, whether the write operation occurs for the chunk, the time of the rebuilding procedure of the first storage device is significantly reduced. In addition, since the target storage area to be performed with the data rebuilding is determined based on the write record and then the chunks to be rebuilt in the target storage area are determined without determining, for each chunk, the chunk to be rebuilt, the data rebuilding time of the first storage device is reduced. Therefore, the method according to embodiments of the present disclosure may reduce the time window when the storage array group is in the degraded state, thereby lowering the offline risk of the storage array group.

Those skilled in the art should understand that each step of the above method of the present disclosure may be implemented by a general-purpose computing apparatus. They may be integrated on a single computing apparatus, or distributed on a network consisting of a plurality of computing apparatuses. Optionally, they may be implemented using the executable program codes of the computing apparatus, such that they are stored in the storage apparatus for the execution by the computing apparatus, or they are respectively manufactured into various integrated circuit assemblies, or multiple assemblies or steps in them are manufactured into a single integrated circuit assembly for implementation. Thus, the present disclosure is not restricted to any particular combinations of hardware and software.

It should be understood that although the above detailed description mentions several apparatuses or sub-apparatuses of the device, the division is only by way of example rather than being compulsory. In fact, features and functions of the above described two or more apparatuses may be materialized in one apparatus according to the embodiments of the present disclosure. On the contrary, features and functions of the above described one apparatus may be further divided and materialized by several apparatuses.

The above description is only optional embodiments of the present disclosure, which does not restrict the present disclosure. For those skilled in the art, the present disclosure may have various modifications and alterations. Any amendments, equivalent substitutions, improvements and the like should be encompassed within the protection scope of the present disclosure as long as they are within the spirit and principle of the present disclosure.

We claim:

1. A method for rebuilding data in a storage array group, the method comprising:

in response to determining that a first storage device of a plurality of storage devices comprised in the storage array group is in a non-working state, generating a write record of the storage device, the write record being generated by setting a corresponding portion of the write record in response to a write operation occurring for a corresponding storage area of a plurality of storage areas in the first storage device during the non-working state, each storage area containing a respective plurality of chunks and corresponding chunk metadata for chunks of the storage area, the chunk metadata including a need_rebuild record used to identify chunks of the storage area needing to be rebuilt; and in response to determining that the first storage device returns from the non-working state to a working state, (1) determining, based on the corresponding portion of the write record being set, that a target storage area in need of execution of data rebuilding is present in the first storage device, (2) marking the need_rebuild record for the target storage area to indicate that the chunks of the target storage area need to be rebuilt, (3) setting a rebuilding checkpoint field to a starting chunk address of a chunk range of the target storage area, and (4) initiating, based on the determining and the rebuilding checkpoint field, a data rebuilding of the target storage area, the data rebuilding being executed chunk-by-chunk according to the need-rebuild record for the target storage area.

2. The method of claim 1, wherein the write record comprises a plurality of bits as the respective portions, each bit of the plurality of bits corresponding to a respective storage area of the plurality of storage areas and indicating whether the write operation occurs for the respective storage area.

3. The method of claim 1, wherein generating the write record comprises:

initializing the write record;

in response to determining that the write operation occurs for the first storage device during the non-working state, calculating an address range of the write operation;

determining, based on the calculated address range, the storage area for which the write operation occurs; and setting a corresponding portion of the write record to indicate the determined storage area.

4. The method of claim 1, wherein determining whether the target storage area is present based on the write record comprises: in response to the write record indicating that no write operation occurs for the storage area of the first storage device during the non-working state, determining absence of the target storage area; and controlling the data rebuilding based on the determining comprises: generating an indication of completion of the data rebuilding without executing the data rebuilding on the first storage device.

5. The method of claim 1, wherein determining whether the target storage area is present based on the write record comprises: in response to the write record indicating that the write operation occurs for the storage area of the first storage device during the non-working state; setting the storage area as the target storage area; and determining presence of the target storage area; and controlling the data rebuilding based on the determining comprises: determining, using the need_rebuild record for the target storage area, an address range of the target storage area on which the write operation is to be performed; executing the data rebuilding for the address range; and generating an indication of completion of the data rebuilding.

6. The method of claim 1, further comprising:

in response to determining that the first storage device maintains in the non-working state for more than a predetermined time period, executing the data rebuilding in a backup storage device associated with the first storage device by using all data for the first storage device.

7. The method of claim 1, further comprising:

storing, in a backup area, data to be written into the first storage device, the backup area comprised in any storage device of the plurality of storage devices other than the first storage device.

8. The method of claim 1, wherein the write record is comprised in metadata recording a configuration of the storage array group.

9. The method of claim 8, wherein the write record is a bitmap corresponding to the first storage device.

10. An electronic device, comprising:

a processor; and a memory coupled to the processor, the memory having instructions stored therein, the instructions, when executed by the processor, causing the electronic device to perform acts comprising:

in response to determining that a first storage device of a plurality of storage devices comprised in the storage array group is in a non-working state, generating a write record of the storage device, the write record being generated by setting a corresponding portion of the write record in response to a write operation occurring for a corresponding storage area of a plurality of storage areas in the first storage device during the non-working state, each storage area containing a respective plurality of chunks and corresponding chunk metadata for chunks of the storage area, the chunk metadata including a need_rebuild record used to identify chunks of the storage area needing to be rebuilt; and in response to determining that the first storage device returns from the non-working state to a working state, (1) determining, based on the corresponding portion of the write record being set, that a target storage area in need of execution of data rebuilding is present in the first storage device, (2) marking the need_rebuild record for the target storage area to indicate that the chunks of the target storage area need to be rebuilt, (3) setting a rebuilding checkpoint field to a starting chunk address of a chunk range of the target storage area, and (4) initiating, based on the determining and the rebuilding checkpoint field, a data rebuilding of the target storage area, the data rebuilding being executed chunk-by-chunk according to the need-rebuild record for the target storage area.

11. The device of claim 10, wherein the write record comprises a plurality of bits as the respective portions, each bit of the plurality of bits corresponding to a respective storage area of the plurality of storage areas and indicating whether the write operation occurs for the respective storage area.

12. The device of claim 10, wherein generating the write record comprises:
    initializing the write record;
    in response to determining that the write operation occurs for the first storage device during the non-working state, calculating an address range of the write operation;
    determining, based on the calculated address range, the storage area for which the write operation occurs; and
    setting a corresponding portion of the write record to indicate the determined storage area.

13. The device of claim 10, wherein
    determining whether the target storage area is present based on the write record comprises: in response to the write record indicating that no write operation occurs for the storage area of the first storage device during the non-working state, determining absence of the target storage area; and
    controlling the data rebuilding based on the determining comprises: generating an indication of completion of the data rebuilding without executing the data rebuilding on the first storage device.

14. The device of claim 10, wherein:
    determining whether the target storage area is present based on the write record comprises: in response to the write record indicating that the write operation occurs for the storage area of the first storage device during the non-working state: setting the storage area as the target storage area; and determining presence of the target storage area; and
    controlling the data rebuilding based on the determining comprises: determining, using the need_rebuild record for the target storage area, an address range of the target storage area on which the write operation is to be performed; executing the data rebuilding for the address range; and generating an indication of completion of the data rebuilding.

15. The device of claim 10, wherein the acts further comprise:
    in response to determining that the first storage device maintains in the non-working state for more than a predetermined time period, executing the data rebuilding in a backup storage device associated with the first storage device by using all data for the first storage device.

16. The device of claim 10, wherein the acts further comprise:
    storing, in a backup area, data to be written into the first storage device, the backup area comprised in any storage device of the plurality of storage devices other than the first storage device.

17. The device of claim 10, wherein the write record is comprised in metadata recording a configuration of the storage array group.

18. The device of claim 17, wherein the write record is a bitmap corresponding to the first storage device.

19. A computer program product having a non-transitory computer readable medium which stores a set of instructions to rebuild data in a storage array group; the set of instructions, when carried out by computerized circuitry, causing the computerized circuitry to perform a method of:
    in response to determining that a first storage device of a plurality of storage devices comprised in the storage array group is in a non-working state, generating a write record of the storage device, the write record being generated by setting a corresponding portion of the write record in response to a write operation occurring for a corresponding storage area of a plurality of storage areas in the first storage device during the non-working state each storage area containing a respective plurality of chunks and corresponding chunk metadata for chunks of the storage area, the chunk metadata including a need_rebuild record used to identify chunks of the storage area needing to be rebuilt; and
    in response to determining that the first storage device returns from the non-working state to a working state, (1) determining, based on the corresponding portion of the write record being set, that a target storage area in need of execution of data rebuilding is present in the first storage device, (2) marking the need_rebuild record for the target storage area to indicate that the chunks of the target storage area need to be rebuilt, (3) setting a rebuilding checkpoint field to a starting chunk address of a chunk range of the target storage area, and (4) initiating, based on the determining and the rebuilding checkpoint field, a data rebuilding of the target storage area, the data rebuilding being executed chunk-by-chunk according to the need-rebuild record for the target storage area.

* * * * *